US007823853B2

(12) United States Patent
Larson et al.

(10) Patent No.: US 7,823,853 B2
(45) Date of Patent: Nov. 2, 2010

(54) HANGING DEVICE FOR USE ON VINYL SIDING

(75) Inventors: William A. Larson, Big Rapids, MI (US); Todd T. Andres, Sparta, MI (US)

(73) Assignee: Larco Products LLC, Big Rapids, MI (US)

( * ) Notice: Subject to any disclaimer, the term of this patent is extended or adjusted under 35 U.S.C. 154(b) by 135 days.

(21) Appl. No.: 12/170,117

(22) Filed: Jul. 9, 2008

(65) Prior Publication Data

US 2009/0019787 A1    Jan. 22, 2009

Related U.S. Application Data

(60) Provisional application No. 60/959,827, filed on Jul. 17, 2007.

(51) Int. Cl.
*E04F 19/00*    (2006.01)
(52) U.S. Cl. .................... 248/339; 52/27; 248/317; 248/309.1; 248/304; 24/370
(58) Field of Classification Search ............ 52/27, 52/DIG. 1, 698, 702; 248/317, 339, 309.1, 248/304, 301; 24/370, 716, 907, 910
See application file for complete search history.

(56) References Cited

U.S. PATENT DOCUMENTS

| 2,672,314 | A | * | 3/1954 | Mitchell ...................... 248/301 |
|---|---|---|---|---|
| 3,199,820 | A | * | 8/1965 | Thompson ............. 248/222.41 |
| D265,969 | S | * | 8/1982 | Koessler ...................... D8/354 |
| 4,406,438 | A | | 9/1983 | Bury |
| 4,435,933 | A | | 3/1984 | Krowl |
| 4,435,938 | A | | 3/1984 | Rutkowski et al. |
| D312,038 | S | * | 11/1990 | Sachs ........................... D8/371 |
| 5,067,061 | A | * | 11/1991 | Prickett ...................... 362/145 |
| 5,150,555 | A | | 9/1992 | Wood |
| D333,421 | S | * | 2/1993 | Patti ............................ D8/356 |
| D373,948 | S | * | 9/1996 | Etzel et al. .................... D8/367 |
| 5,606,835 | A | * | 3/1997 | Champagne .................. 52/545 |
| 5,634,314 | A | * | 6/1997 | Champagne .................. 52/712 |
| 5,639,049 | A | * | 6/1997 | Jennings et al. ............. 248/74.2 |
| 5,794,384 | A | * | 8/1998 | Dean et al. ...................... 52/16 |
| 5,875,602 | A | | 3/1999 | Lappin et al. |
| 5,964,434 | A | * | 10/1999 | Lynch, Jr. .................... 248/60 |
| D420,568 | S | | 2/2000 | Repmann et al. |
| 6,276,649 | B1 | | 8/2001 | Kruse |

(Continued)

*Primary Examiner*—Brian E Glessner
*Assistant Examiner*—Jason Holloway
(74) *Attorney, Agent, or Firm*—Van Dyke, Gardner, Linn & Burkhart, LLP

(57) ABSTRACT

A hanging device attachable to overlapping siding members for supporting objects comprises an insert edge extending outwardly from an upper section, an offset section, and a lower section. The insert edge is insertable into the joint between adjacent siding members and the lower section includes a support element adapted to retain objects. The offset section extends between and joins the upper section with the lower section, with the offset section spacing the lower section from a siding member when the insert edge is inserted between adjacent siding members. The hanging device may be biased about a pivot area when an object is held by the support element such that the insert edge is urged into the joint between adjacent siding members. The insert edge defines an obtuse angle relative to the upper section and the support element may comprise hook members or mounting holes.

8 Claims, 4 Drawing Sheets

U.S. PATENT DOCUMENTS

| | | | | |
|---|---|---|---|---|
| D451,007 S * | 11/2001 | Jones et al. | | D8/395 |
| 6,328,459 B1 | 12/2001 | Adams | | |
| 6,338,460 B1 * | 1/2002 | Rumpel | | 248/229.16 |
| 6,490,835 B1 | 12/2002 | Simmons | | |
| 6,494,594 B1 * | 12/2002 | Schroetter | | 362/249.01 |
| 6,497,396 B1 * | 12/2002 | Adams | | 248/304 |
| 6,600,117 B1 | 7/2003 | Gretz | | |
| D481,932 S | 11/2003 | Bess | | |
| D482,489 S * | 11/2003 | Gary et al. | | D26/138 |
| 6,643,900 B2 * | 11/2003 | Jahrling | | 24/563 |
| 6,725,618 B2 | 4/2004 | Albracht | | |
| D491,447 S * | 6/2004 | Diss | | D8/373 |
| 6,883,288 B1 | 4/2005 | Harbin | | |
| 6,904,729 B1 * | 6/2005 | Shroyer | | 52/510 |
| 6,932,310 B1 * | 8/2005 | Diss | | 248/301 |
| 6,951,081 B2 | 10/2005 | Bonshor | | |
| 6,953,890 B2 | 10/2005 | Koessler | | |
| 6,958,447 B1 | 10/2005 | Thornton et al. | | |
| 6,963,029 B1 | 11/2005 | Rivers et al. | | |
| 7,008,213 B2 | 3/2006 | King | | |
| 7,080,080 B1 | 7/2006 | Miller | | |
| D528,222 S | 9/2006 | Meadows et al. | | |
| 7,117,591 B1 | 10/2006 | Gretz | | |
| 7,201,355 B1 * | 4/2007 | Zien et al. | | 248/301 |
| 7,287,354 B2 * | 10/2007 | Rivers et al. | | 52/220.1 |
| 2002/0186562 A1 * | 12/2002 | Schroetter | | 362/249 |

\* cited by examiner

HANGING DEVICE FOR USE ON VINYL SIDING

CROSS REFERENCE TO RELATED APPLICATION

The present application claims priority of U.S. provisional application, Ser. No. 60/959,827 filed Jul. 17, 2007, by Larson et al. for HANG DEVICE FOR USE ON VINYL SIDING, which is hereby incorporated herein by reference in its entirety.

FIELD OF THE INVENTION

The present invention is directed to a device for hanging objects, and in particular is directed to a device for mounting to overlapping exterior siding to hang objects there from.

It is often desired to support or hang objects on a vertical surface containing overlapping siding members. The overlapping siding members may comprise horizontally extending exterior siding members, such as vinyl or aluminum siding, and the objects to be supported or hung may include Christmas lights, ornamental decorations, signs, address or house numbers, and the like, as well as extension cords, cable or satellite television cords, or the like.

SUMMARY OF THE INVENTION

The present invention provides a hanging device that is readily inserted into and removed from joints between overlapping siding members and when inserted therein is adapted to support or be used to hang objects on the hanging device.

According to an aspect of the present invention, a hanging device attachable to overlapping siding members for supporting objects there from comprises an insert edge, an upper section with the insert edge extending outwardly from the upper section, an offset section, and a lower section. The insert edge is insertable into the joint between adjacent siding members and the lower section includes a support element adapted to retain objects. The offset section extends between and joins the upper section with the lower section, with the offset section spacing the lower section from a siding member when the insert edge is inserted into the joint between adjacent siding members.

The hanging device includes a pivot area formed on an upper back surface of the hanging device, with the hanging device being biased about the pivot area when an object is held by the support element such that the insert edge is urged into the joint between adjacent siding members. The insert edge may extend from an upper section to define an obtuse angle relative to the upper section and the support elements may comprise one or more hook members and/or one or more mounting holes.

According to another aspect of the present invention, a hanging device attachable to overlapping exterior siding members for supporting objects there from comprises an insert edge extending outwardly from an upper section to define an obtuse angle relative to the upper section, with the insert edge being insertable into the joint between adjacent siding members. The hanging device also includes a lower section and an offset section. The lower section includes a support element adapted to retain objects. The offset section joins the upper section with the lower section to space the upper section from the lower section such that a plane defined by the upper section is generally parallel to a plane defined by the lower section. A pivot area is formed on an upper back surface of the hanging device with the hanging device being biased about the pivot area when an object is held by the support element such that the insert edge is urged into the joint between adjacent siding members. The support element may comprise one or more hook members and/or one or more mounting holes.

A method of supporting or hanging an object from overlapping siding members in accordance with the present invention includes providing a hanging device having an insert edge, an upper section, an offset section, and a lower section, with the insert edge extending outwardly from the upper section and the lower section including a support element. The method further includes positioning the insert edge at the joint between overlapping siding members, pushing or inserting the insert edge into the joint between the siding members, and supporting an object on the support element whereby the insert edge is biased into the joint. The method may also include rotating the hanging device while pushing or inserting the insert edge into the joint between the siding members.

The hanging device of the present invention provides a mechanism and method of supporting or hanging objects on overlapping siding members. The insert edge of the hanging devices is readily insertable into the joint of overlapping siding members and does not require an additional tool for installation or removal. The ease of installation and/or removal of hanging devices is facilitated by the obtuse angle formed between the insert edge and the upper section. The insert edge is further biased into engagement with the joint when an object is supported on the hanging device due to the tendency of the hanging device to pivot or rotate about a pivot area and thereby bias the insert edge into further engagement. The biasing of hanging devices into the joint is facilitated, in part, by the pivot area or pivot areas at the upper back surface, as well as by the spacing of the lower section away from the siding member provided by the offset member. The hanging devices may be used with vinyl siding, aluminum siding, or other types of overlapping siding. Multiple hanging devices may be used together to support an object, such as positioning hanging devices above, below and/or around an object to be supported. Accordingly, objects may be supported on overlapping siding members without forming holes in the siding for a threaded fastener, nail, or the like, which may create leak paths or allow access by insects or pests into an interior part of a wall, or without the need for adhesives.

These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
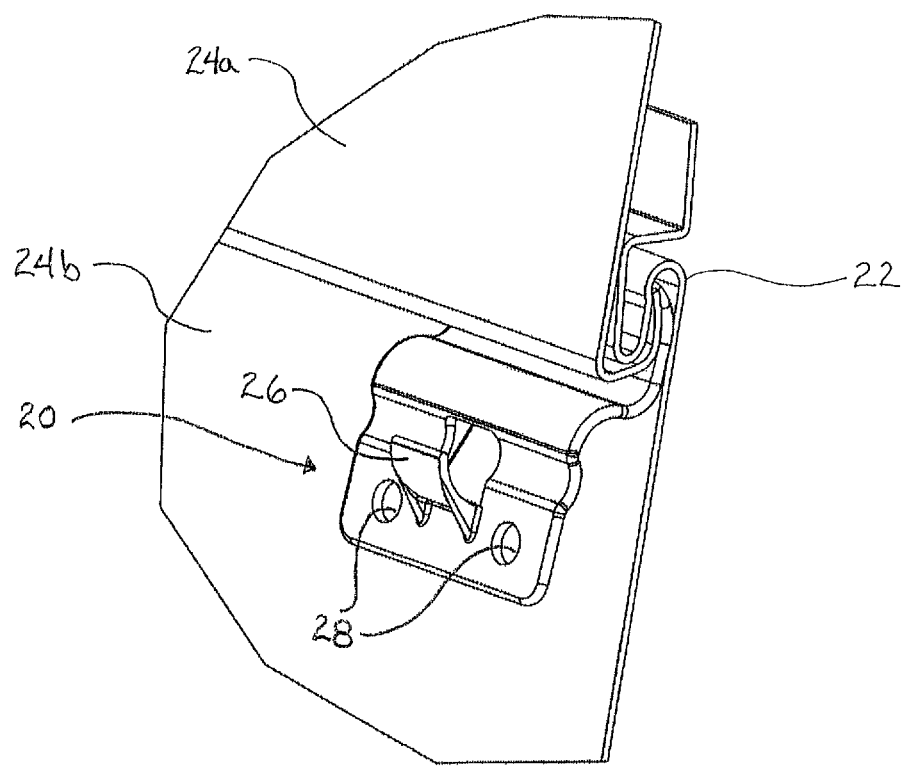
FIG. 1 is a perspective view of a hanging device in accordance with the present invention assembled to overlapping siding members.
Figure 2:
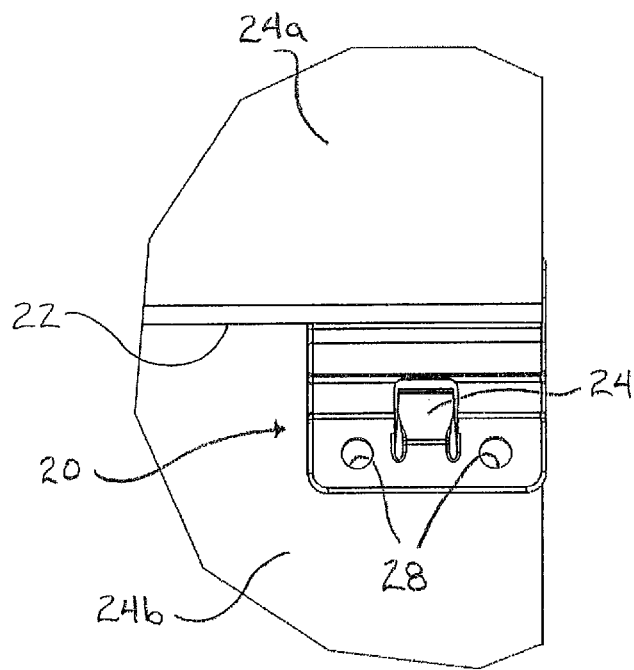
FIG. 2 is a front elevation view of the hanging device assembled to the overlapping siding members of FIG. 1.
Figure 3:
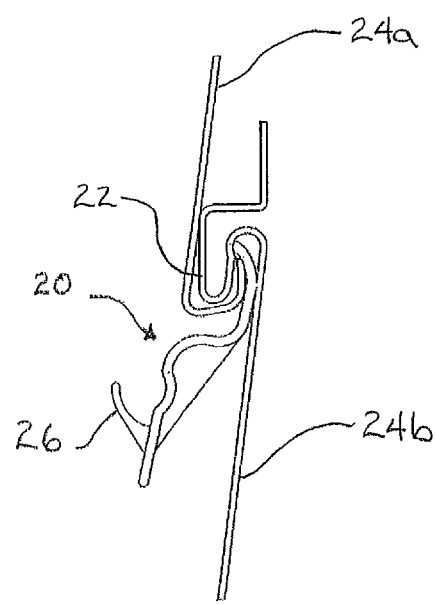
FIG. 3 is a side elevation view of the hanging device assembled to the overlapping siding members of FIG. 1.

A hanging device 20 is shown in FIGS. 1-3 inserted into the joint 22 between overlapping siding members 24, such as the joint between horizontally extending exterior siding members used on a home or building. Hanging device 20 includes receiving or support elements, which in the illustrated embodiment are disclosed as a hook member 26 and mounting holes 28 used to support objects thereon. Hanging device 20 may be used, for example, to support objects such as Christmas lights, ornamental decorations, signs, address or house numbers, and the like. Notably, hanging device 20 is attached to and supported on siding members 24 without requiring holes to be formed in or adhesives to be applied to the siding members 24. As described in detail below, hanging device 20 is configured to be readily inserted into the joint 22 between adjacent siding members 24 and the supporting of an object from hook member 26 or mounting holes 28 aids in biasing hanging device 20 into engagement with the siding members 24.

Figure 7:
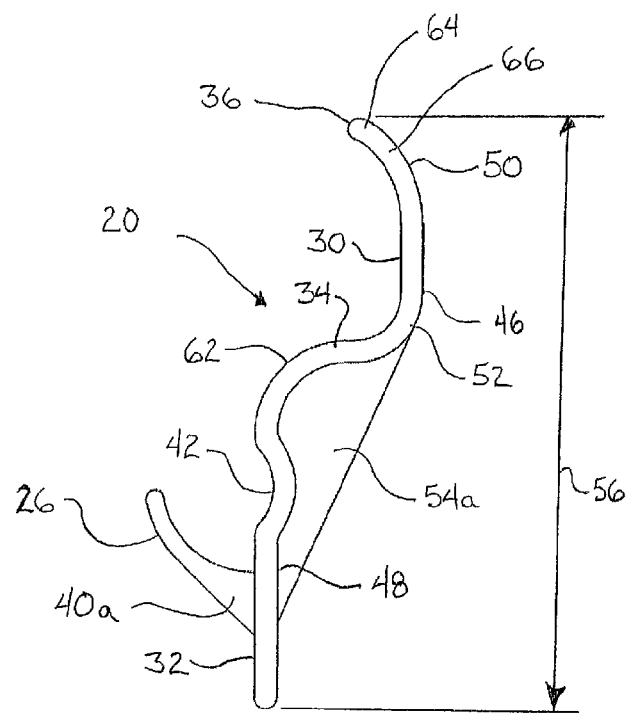
FIG. 7 is a right side elevation view of the hanging device of FIG. 4.
Figure 8:
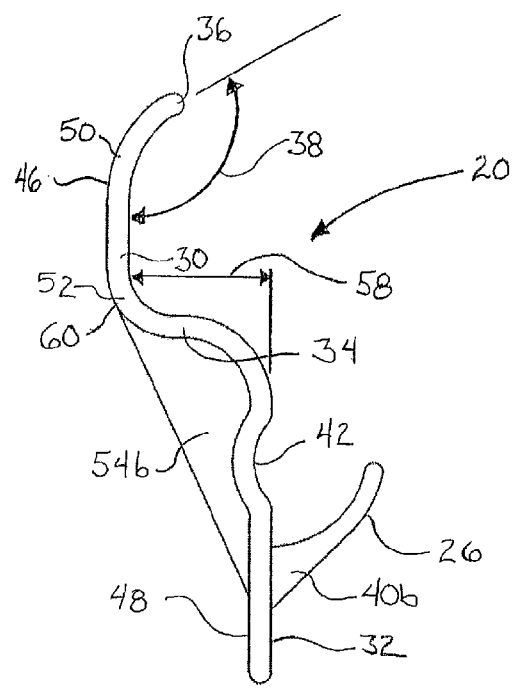
FIG. 8 is a left side elevation view of the hanging device of FIG. 4.
Figure 9:
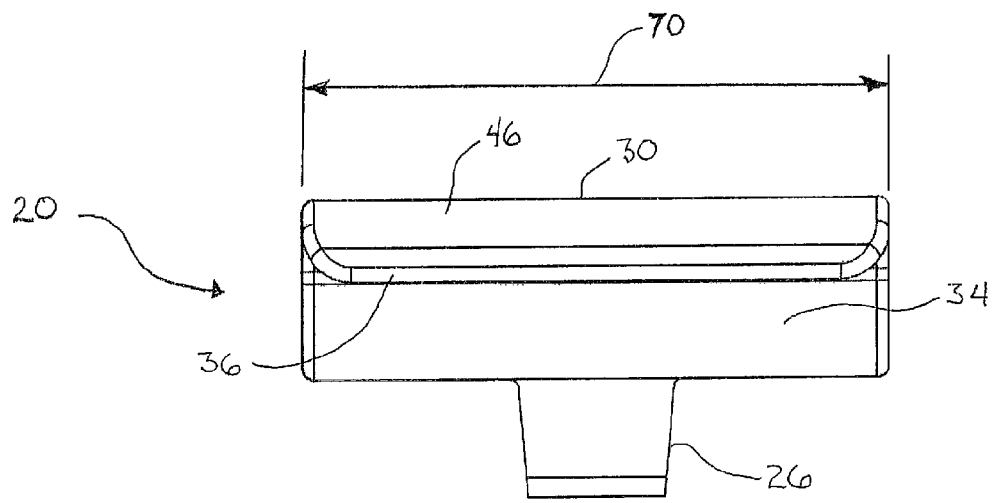
FIG. 9 is a top elevation view of the hanging device of FIG. 4.

Referring now to FIGS. 4-9, hanging device 20 includes an upper section 30 and a lower section 32 joined together by an offset section 34. An insert edge 36 extends outwardly from the upper section 30 and forms a curved lip. As shown in FIG. 8, insert edge 36 extends outwardly to generally define an obtuse angle 38 relative to upper section 30.

The previously noted hook member 26 and mounting holes 28 are formed or located on lower section 32. Hook gussets 40a, 40b are positioned on either side of hook member 26 for reinforcing hook member 26 when objects are supported thereon. The lower section 32 also includes a horizontally extending detent 42, with an opening 44 being located in lower section 32 across detent 42 and aligned with hook member 26.

Figures 5, 6:
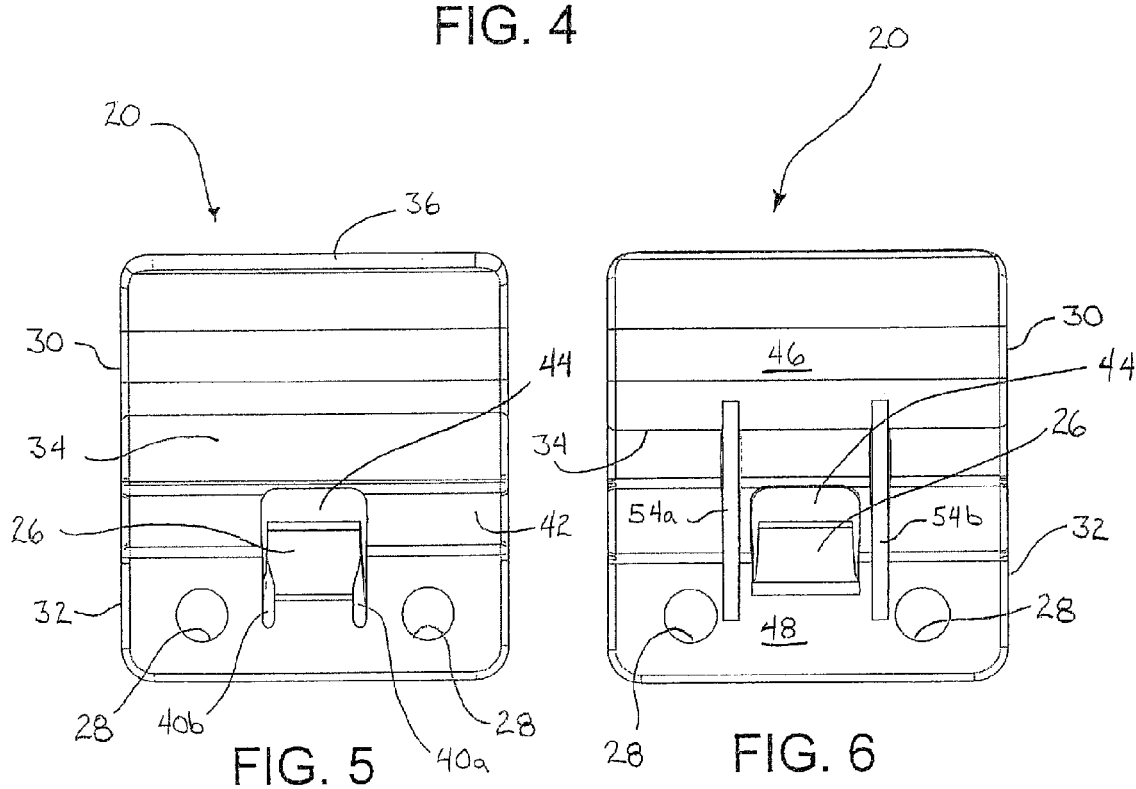
FIG. 5 is a front elevation view of the hanging device of FIG. 4.
FIG. 6 is a back elevation view of the hanging device of FIG. 4.

Hanging device 20 also includes an upper back surface 46 and a lower back surface 48 (FIGS. 6-8). Upper back surface 46 defines a pivot area about which hanging device 20 is biased when hanging device 20 is installed in the joint 22 between siding members 24 and used to support an object. Upper back surface 46 includes a first or primary pivot area 50 proximate insert edge 36. As shown in FIGS. 7 and 8, first pivot area 50 comprises a rounded or curved surface extending the entire width of hanging device 20. A second or secondary pivot area 52 is also positioned on upper back surface 46 at the connection of upper section 30 with offset section 34. It should be appreciated, as described in more detail below, that hanging device 20 may pivot or be biased about the upper back surface 46 as a pivot area, and not merely just the first pivot area 50 or second pivot area 52. A pair of gussets 54a, 54b extends between lower back surface 48 to offset section 34 for reinforcing hanging device 20.

Figure 4:
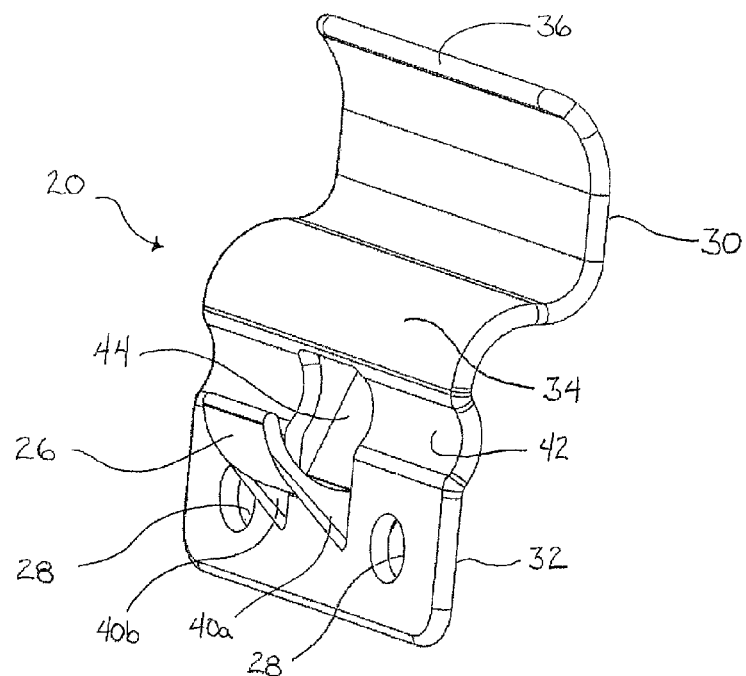
FIG. 4 is a perspective view of the hanging device of FIG. 1 shown removed from the overlapping siding members.

In the illustrated embodiment of hanging device 20, as understood from FIGS. 4, 7 and 8, upper section 30 and lower section 32 comprise substantially planar portions that define planes which are generally parallel to each other. Offset section 34 extends between and joins upper section 30 and lower section 32, with offset section 34 defining a separate segment extending at an angle relative to both upper section 30 and lower section 32. As shown, offset section 34 extends outwardly from upper section 30 and lower section 32 depends generally downwardly from offset section 34, with offset section 34 defining or approximating right angles to both upper section 30 and lower section 32. In the embodiment of FIGS. 7 and 8, offset section 34 extends outwardly from upper section 30 an amount or distance further than the outward extension of insert edge 36 from upper section 30.

Referring now to FIG. 3, hanging device 20 is assembled to siding members 24 by positioning insert edge 36 at the joint between overlapping siding members 24, which in the illustrated embodiment comprises an upper siding member 24a and a lower siding member 24b. Initially, hanging device 20 is held such that insert edge is directed upward into joint 22 between siding members 24a, 24b. Insert edge 36 is then pushed upward into joint 22 between siding members 24a, 24b while rotating hanging device 20 counter-clockwise about insert edge 36 with respect to the view of FIG. 3. Lower section 32 is thereby spaced from lower siding member 24b, as illustrated in FIG. 3, when hanging device 20 is installed into joint 22 between adjacent siding members 24a, 24b.

As previously noted, hanging device 20 is biased into engagement with joint 22 between siding members 24a, 24b when an object is supported thereon. In particular, with further reference to FIG. 3, insert edge 36 is biased into joint 22 by rotation about the pivot area of upper back surface 46 when an object is supported on lower section 32, such as upon hook member 26. Due to the spacing of lower section 32 from siding member 24, the weight of an object placed on hook member 26, or on another support element, will tend to cause hanging device to be biased about upper section 30, thereby forcing insert edge 36 further into joint 22 and increasing the retention of hanging device 20 therein.

The degree to which hanging device 20 rotates about pivot area of upper back surface 46 when installed between adjacent siding members 24 is in part dependent upon the play or spacing in joint 22 and the biasing force provided by the weight of an object supported by hanging device 20. For example, hanging device 20 will at least, or initially, be biased about first pivot area 50. Further rotation may then occur about upper section 30 and second pivot area 52 should sufficient play in joint and/or biasing force be applied to hanging device 20. The biasing of insert edge 36 into joint 22 aids in the retention of hanging device 20 to the siding members 24.

Numerous types of objects may be retained and displayed or mounted to siding members 24 using hanging device 20. For example, hanging device 20 may be used to support objects such as Christmas lights, ornamental decorations, signs, house address numbers, and the like. Extensions cords or elongate light strands may also be supported using hanging device 20. For example, multiple hanging devices 20 may be disposed along a wall or surface covered with siding members 24 and an electric cord may be disposed generally horizontally there along by placing the cord over hook member 26 such that the cord is further retained or placed within detent 42. Hanging devices 20 may also be used to support a rigid plaque. For example, a lower edge of a plaque may be placed to rest on hook members 26 from two or more hanging devices 20. A plaque or the like may also or alternatively include a mounting hole on a back surface of the plaque, in which case the mounting hole of the plaque may be placed about a hook member 26.

Still further, objects may be secured to hanging devices 20 by way of mounting holes 28. For example, an object may be secured to hanging device 20 by use of a fastener (not shown)

passed through mounting holes 28, such as a threaded fastener or a key ring. Objects may also be affixed to hanging device 20 by way of a cable tie or zip tie, or the like, passed through one or both of mounting holes 28.

With reference now to FIGS. 7 and 8, the size and shape of the illustrated hanging device 20 will be discussed. In one embodiment of hanging device 20, hanging device has a height 56 (FIG. 7) of approximately 1.615 inches, and an offset distance 58 (FIG. 8) of approximately 0.4 inches between the front surfaces of upper section 30 and lower section 32. A radius 60 (FIG. 8) of approximately 0.185 inches is located at the transition between upper section 30 and offset section 34, and a radius 62 (FIG. 7) of approximately 0.250 inches is located at the transition between offset section 34 and lower section 32. Also in the illustrated embodiment, insert edge 36 comprises a first edge radius 64 (FIG. 7) of approximately 0.138 inches and a second edge radius 66 (FIG. 7) of approximately 0.34 inches. Detent 42 has a radius of approximately 0.15 inches. Hanging device has a width 70 (FIG. 9) of approximately 1.5 inches. Alternative hanging devices, however, may have different dimensions from the aforementioned illustrated dimensions. Alternative hanging devices may have differing heights, widths, and radiuses and still function as intended. Still further, instead of radiuses, an alternative hanging device may have angled bends, such as for example, at the transitions of upper section to offset section, and from offset section to lower section.

Figure 10:
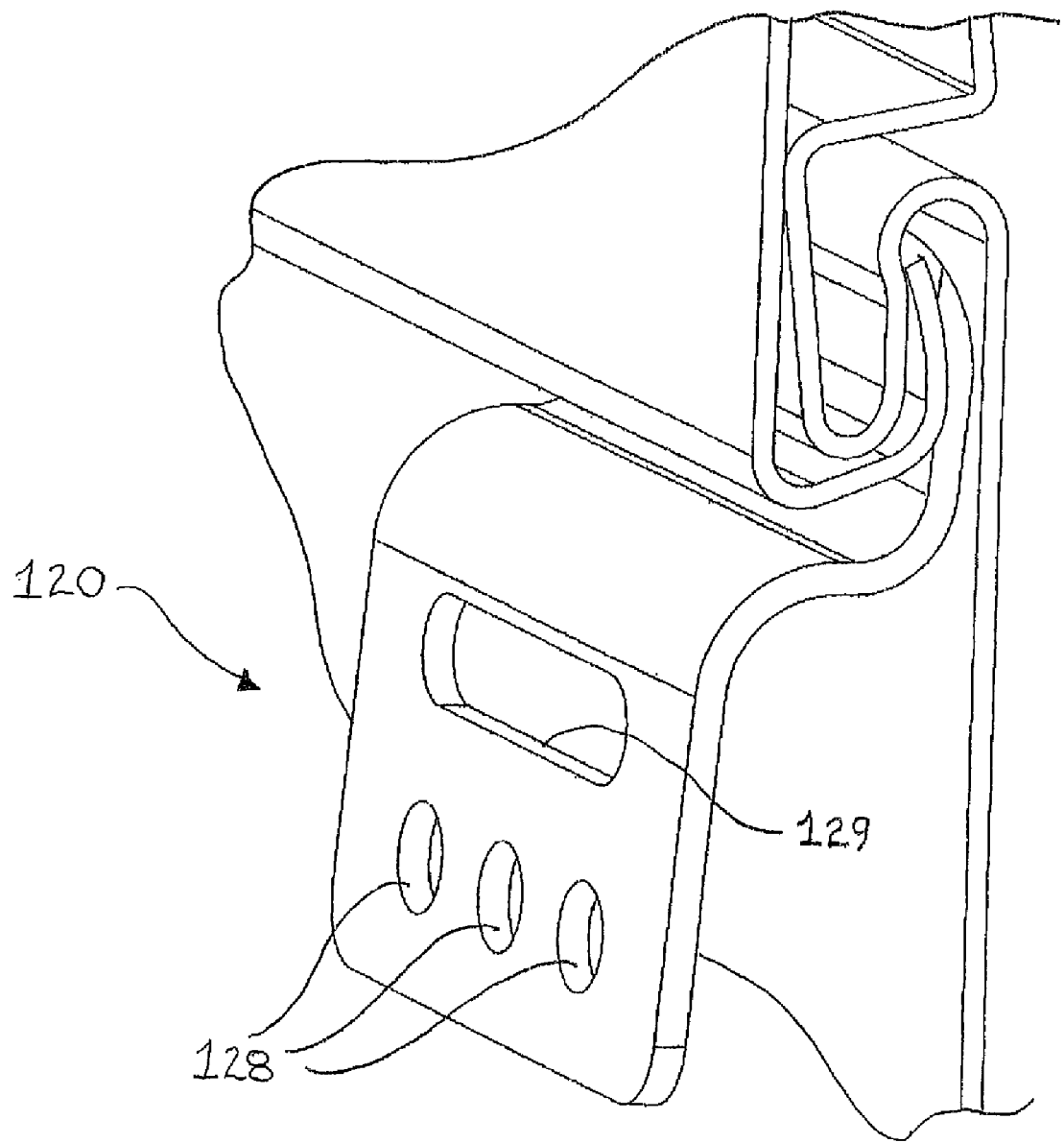
FIG. 10 is a perspective view of an alternative hanging device in accordance with the present invention assembled to overlapping siding members.

Referring now to FIG. 10, an alternative hanging device 120 is illustrated. Hanging device 120 is of substantially similar construction to hanging device 20, with similar features of hanging device 120 being identified with the reference numeral 100 added to the reference numbers of hanging device 20. Due to the similarity of hanging devices 20 and 120, not all of the features and characteristics of hanging device 120 are discussed herein. Hanging device 120 includes alternative receiving or support elements for supporting objects, which in the illustrated embodiment of FIG. 10 are disclosed as mounting holes 128 and a mounting slot 129. Although not shown, a hanging device may alternatively be constructed to only include one or more hook members without mounting holes and/or a mounting slot.

The present hanging devices may be used to support objects such as Christmas lights, ornamental decorations, signs, address or house numbers, as well as extension cords, cable television cords, or the like. The hanging devices of the illustrated embodiments are made of polypropylene, but may be made of an alternative polymeric or plastic material, or metal, or the like, and may be used with vinyl siding, aluminum siding, or other types of overlapping siding. Multiple hanging devices may be used together to support an object, such as positioning hanging devices above, below and/or around an object to be supported. The insert edge of the hanging devices is readily insertable to the joint of overlapping siding members and does not require an additional tool for installation or removal. The ease of installation and/or removal of hanging devices is facilitated by the obtuse angle formed between the insert edge and the upper section. The insert edge is further biased into engagement with the joint when an object is supported on the hanging device due to the tendency of the hanging device to pivot or rotate and thereby bias the insert edge into further engagement. The biasing of hanging devices into the joint is facilitated, in part, by the pivot area or pivot areas at the upper back surface, as well as by the spacing of the lower section away from the siding member provided by the offset member. Accordingly, objects may be supported on overlapping siding members without forming holes in the siding or without the need for adhesives.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A hanging device attachable to overlapping exterior siding members for supporting objects there from, said hanging device comprising:

an insert edge, said insert edge defining a distal end of said hanging device for insertion into the joint between adjacent siding members;

an upper section, said insert edge extending outwardly from said upper section to define an obtuse angle relative to said upper section;

a lower section, said lower section including a support element adapted to retain objects;

an offset section, said offset section joining said upper section with said lower section and spacing said upper section from said lower section such that a plane defined by said upper section is generally parallel to a plane defined by said lower section;

a pivot area formed on an upper back surface of said hanging device with said pivot area comprising a curved surface extending from said upper section to said insert edge, said hanging device being biased about said pivot area such that said insert edge is urged into the joint between adjacent siding members to retain said hanging device in place; and a gusset extending between a back surface of said lower section to said offset section.

2. The hanging device of claim 1, further comprising a secondary pivot area formed on said upper back surface, wherein said secondary pivot area comprises a curved surface extending between said upper section and said offset section whereby said hanging device is able to rotate about said secondary pivot area upon further biasing of said hanging device such that said insert edge is further urged into the joint between adjacent siding members.

3. The hanging device of claim 1, wherein said pivot area extends the entire width of said hanging device.

4. The hanging device of claim 1, wherein said pivot area comprises a first edge radius and a second edge radius, with said first edge radius being proximate said insert edge and having a radius that is smaller than said second edge radius.

5. The hanging device of claim 2, wherein said first edge radius is approximately 0.14 inches and said second edge radius is approximately 0.34 inches.

6. The hanging device of claim 1, wherein said insert edge extends the entire width of said upper section.

7. The hanging device of claim 1, wherein said support element comprises at least one of a hook member and a mounting hole.

8. A hanging device attachable to overlapping exterior siding members for supporting objects there from, said hanging device comprising:

an insert edge, said insert edge defining a distal end of said hanging device for insertion into the joint between adjacent siding members;

an upper section, said insert edge extending outwardly from said upper section to define an obtuse angle relative to said upper section with said insert edge and said upper section being of substantially uniform equal thicknesses;

a lower section, said lower section including a support element adapted to retain objects;

an offset section, said offset section joining said upper section with said lower section and spacing said upper section from said lower section such that a plane defined by said upper section is generally parallel to a plane defined by said lower section;

a first pivot area formed on an upper back surface of said hanging device with said first pivot area comprising a curved surface extending from said upper section to said insert edge, said hanging device being initially biased about said first pivot area such that said insert edge is urged into the joint between adjacent siding members to retain said hanging device in place;

a second pivot area formed on said upper back surface, with said second pivot area comprising a curved surface extending between said upper section and said offset section whereby said hanging device is able to rotate about said second pivot area upon further biasing of said hanging device such that said insert edge is further urged into the joint between adjacent siding members; and a gusset extending between a back surface of said lower section to said offset section.

* * * * *